Sept. 2, 1969    C. M. SENN ETAL    3,465,118
SIDE-SHIFTING, STRIP-WELDING APPARATUS Filed Oct. 21, 1966    2 Sheets-Sheet 1

INVENTORS
Charles M. Senn &
Owen S. Cecil, Jr.

Sept. 2, 1969   C. M. SENN ETAL   3,465,118
SIDE-SHIFTING, STRIP-WELDING APPARATUS
Filed Oct. 21, 1966   2 Sheets-Sheet 2
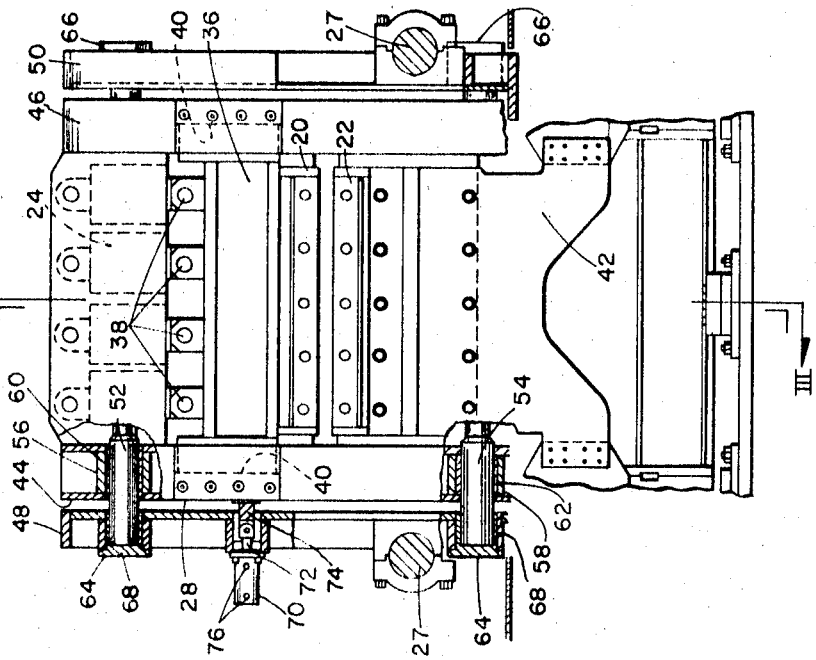
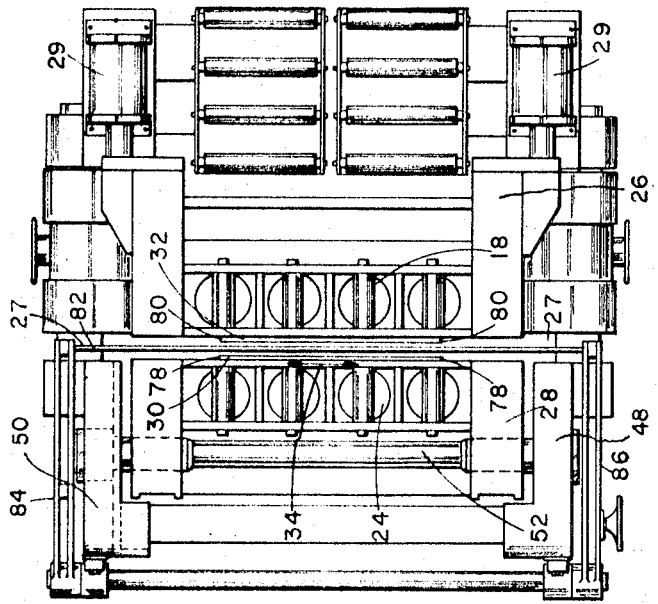
INVENTORS
Charles M. Senn &
Owen S. Cecil, Jr.

United States Patent Office 3,465,118
Patented Sept. 2, 1969

3,465,118
SIDE-SHIFTING, STRIP-WELDING APPARATUS
Charles M. Senn and Owen S. Cecil, Jr., Pittsburgh, Pa.,
assignors to Mesta Machine Company, Pittsburgh, Pa.,
a corporation of Pennsylvania
Filed Oct. 21, 1966, Ser. No. 588,484
Int. Cl. B23k 9/02, 11/04
U.S. Cl. 219—101                                    7 Claims

ABSTRACT OF THE DISCLOSURE

We disclose apparatus for aligning and joining objects said apparatus comprising a pair of clamping members for each of said objects, means for supporting each of said clamping members upon said apparatus, one of said supporting means being mounted for movement of its clamping toward and away from the other of said clamping members, the other of said supporting means being mounted for movement in a direction transverse to that of said first mentioned movement, and means for joining said objects when so clamped. We also disclose means for electrically insulating at least one of said supporting means.

---

The present invention relates to welding apparatus or the like and more particularly to a side-shifting housing or support for use therein for supporting welding dies or other clamping mechanism. According to one arrangement of the invention the side-shifting housing is adapted for positioning certain of the welding dies or clamping mechanism of such apparatus particularly when employed for welding or otherwise handling strip material.

Before butt welding or otherwise joining ends of various types of strip material, it is necessary to align carefully the lateral edges respectively of the strip end portions to be joined. In conventional welding or joining apparatus for this purpose, independently operated sideguides are provided at the entry and delivery ends of the apparatus in order to effect alignment of the strips prior to clamping thereof between the welding dies or other joining mechanism.

However, handling of the strip to carefully position the end portions thereof in this fashion is time-consuming, and in a continuous processing line such care is not always taken, for one reason or the other, in aligning the strip ends. Moreover, in the conventional welding apparatus, when the strip end portions are clamped between their respective die assemblies, the alignment of the strip ends cannot be checked properly until the welding gauge is removed from between the pairs of dies to give an unobstructed view of the strip ends. If the strip ends at this time are not properly aligned, it is a time-consuming procedure to unclamp the welding dies, realign and regauge the strip ends and then reclamp the dies. Under the stress of production pressures the advisability of making a realignment of the strip ends in this fashion may simply be ignored. Moreover, after the second attempt the strip ends still may not be aligned properly.

We have solved this problem by mounting at least one pair of the welding dies or other clamping means upon or within a housing or support which is movable laterally of the path of the strips or other objects through the welder. The housing is supported in a novel manner with reference to the apparatus together with novel mechanism for laterally displacing the housing a predetermined distance toward either side of its centered position in the apparatus.

In a specific example of our invention, the side-shifting housing or support is incorporated into welding apparatus which is provided with means for separating and closing a plurality of welding dies in both the vertical and horizontal directions. A pair of the dies between which one of the strip ends is clamped are mounted upon a housing which can be displaced in a direction so as to align the strip ends after they have been clamped by their associated dies.

In the case of welding apparatus, it is necessary to insulate the side-shifting housing from the remainder of the apparatus, and in accordance with another feature of our invention novel means are provided for supporting the movable, side-shifting housing and for electrically insulating the housing without unduly subjecting the electrical insulation to wear caused by movements of the side-shifting housing. The latter arrangement avoids premature wear or breakage of the electric insulation and forestalls the possibility of its unexpected failure during operation of the welding apparatus.

The mechanism for so moving our side-shifting housing is simple and rugged in construction, easy to operate, and is capable of accommodating the large loadings frequently encountered by the welding apparatus, particularly when handling rather heavy strip material or the like. The alignment of the strip ends can be effected by the mechanism under the control of a single operator without the necessity of further handling of the strip material.

In the foregoing paragraphs various objects, features and advantages of the invention have been alluded to. These and other objects, features and advantages of the invention will be elaborated upon during the forthcoming description of certain presently preferred embodiments of our invention, together with presently preferred methods of practicing the same. In the accompanying drawings, we have shown certain presently preferred embodiments of the invention and have illustrated certain presently preferred methods of practicing the same, wherein:

FIGURE 2 is a vertically sectioned view of the apparatus shown in FIGURE 1 and taken generally along reference line II—II thereof;

FIGURE 4 is a top plan view of the apparatus as shown in FIGURE 1.

Although the side-shifting housing arrangement of our invention is described herein primarily with reference to electric welding apparatus for welding strip material, it will be understood of course that the principles of our invention can be utilized for alignment purposes or the like in other types of machinery.

Figure 1:
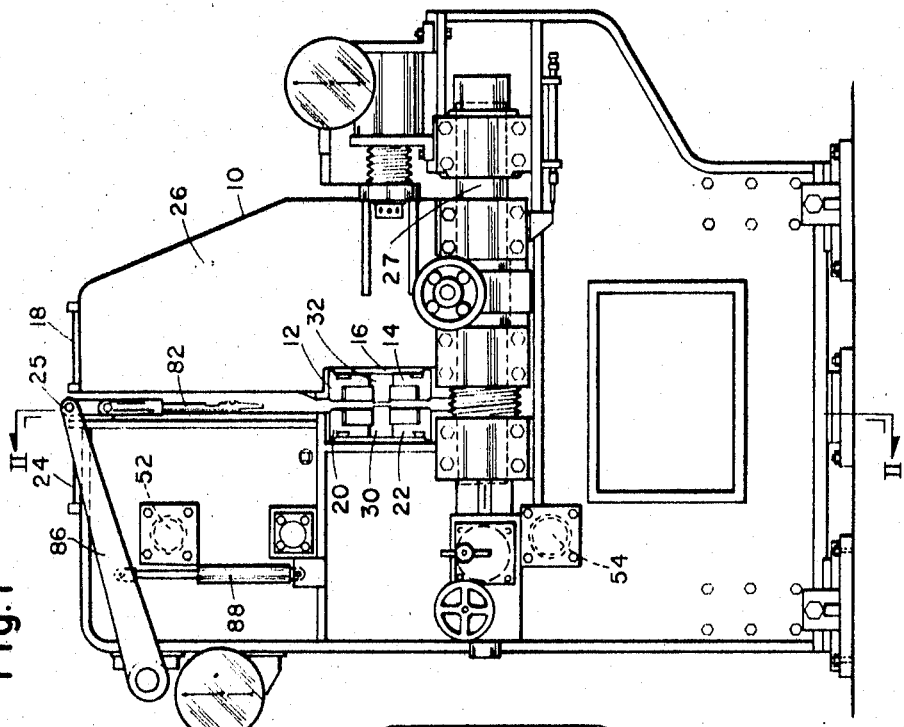
FIGURE 1 is a side elevational view of one form of apparatus constructed in accordance with our invention.

Referring now more particularly to the drawings and initially to FIGURE 1 thereof, the welding apparatus 10 shown therein comprises a first pair of die assemblies 12 and 14, of which the upper die assembly 12 can be moved vertically in this example to open and close the space 16 between the vertically paired dies 12, 14. This can be accomplished for example by a bank of cylinders and pistons denoted generally by reference character 18. The welding apparatus 10 includes a second pair of dies 20, 22, the upper die 20 of which can be similarly raised and lowered by means of a similar piston and cylinder arrangement 24. A housing or support 26 for the first-mentioned dies 12, 14 is movable longitudinally and horizontally in order to advance and withdraw the dies 12, 14 relative to the dies 20, 22 as determined by use of strip gauge mechanism denoted generally by reference character 25. The longitudinally movable housing 26 is mounted for such movement on a pair of longitudinal shafts 27 (FIGURE 1) and such movement is controlled by cylinders 29 as better shown in FIGURE 4.

The foregoing and other constructional details of an exemplary form of strip welding apparatus, with which the present invention can be utilized to advantage, are described and claimed in a copending, coassigned application of Charles M. Senn et al., filed concurrently herewith Oct. 2, 1966 and entitled "Welding Apparatus," Ser. No. 588,485, and in other copending applications identified therein.

Figure 3:
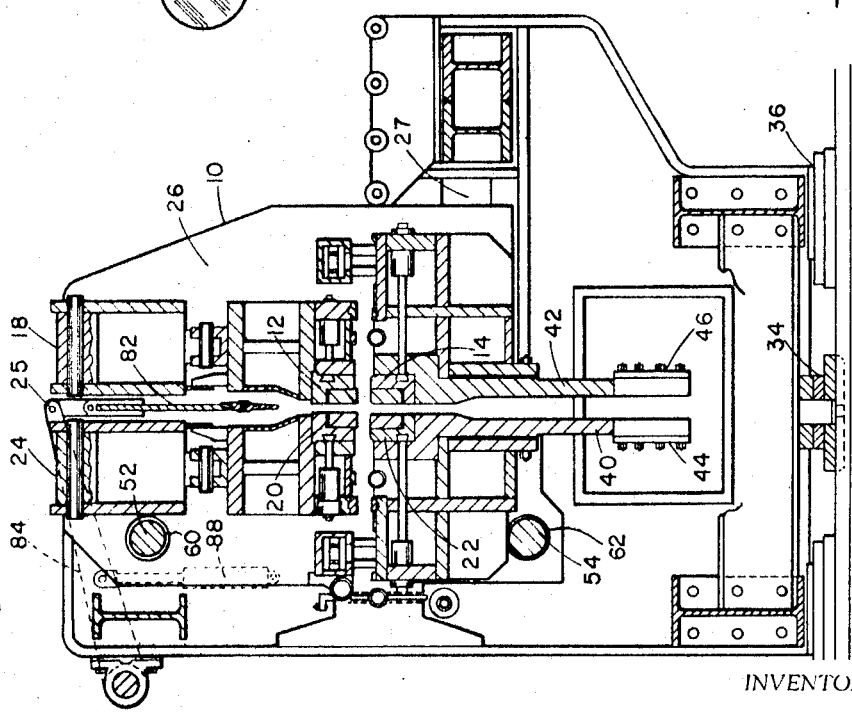
FIGURE 3 is a vertically sectioned view of the apparatus shown in FIGURE 2 and taken generally along reference line III—III thereof.

In accordance with the present invention and as better shown in FIGURES 2 to 4 of the drawings, the last-mentioned pair of dies 20, 22 are mounted in a side-shifting housing or support 28, whereby the dies 20, 22 can be displaced longitudinally thereof or laterally of the path of the strips to be joined so that the juxtaposed ends 30, 32 of the strips can be aligned after clamping between the dies 12, 14 and 20, 22 (FIGURES 1 and 3). For this purpose, the strip end 30 can be moved laterally by the housing 28 as denoted by arrow 34 in FIGURE 4.

The provision of the side-shifting housing 28 does not interfere with the normal opening and closing motions of its upper die 20, as the latter is mounted on a vertically slidable housing component 36 which in turn is supported by the cylinder bank 24 by means of clevis and bracket connections 38. The housing component 36 is guided throughout such movement by vertically disposed slideways 40.

The lower die 22 of the side-shifting housing 28 is mounted in the usual fashion adjacent the lower end of the housing, and, in this example, welding current is supplied thereto by bus bar 42. The side-shifting housing 28 thus comprises in this example a pair of spaced vertical supports 44 and 46 which are separated and stabilized by a number of transverse supporting members in the conventional fashion. The housing 28, particularly by means of its vertical supports 44, 46, is mounted for lateral movement between a pair of respectively adjacent fixed supports or uprights 48, 50 which are connected in this example by upper and lower shafts 52 and 54.

The side-shifting housing 28 is slidably mounted upon the transverse shafts 52, 54 (FIGURES 2 and 3) for lateral movement of the housing toward and away from the adjacent fixed supports 48, 50. In furtherance of this purpose each of the housing's vertical supports 44, 46 includes a pair of tubular spacers 56, 58 and, in this example, bronze sleeve bearings 60 and 62 through which the adjacent enlarged end portions of the shafts 52, 54 are respectively inserted.

The supporting shafts 52, 54 for the housing 28 are intended to remain stationary as the laterally movable housing 28 is moved or slid thereover. In furtherance of this purpose the ends of each supporting shaft 52 or 54 are supported respectively in a pair of cup members 64, 66 which are mounted on the fixed supports 48, 50 respectively in alignment with the tubular spacers 56 and 58. When the side-shifting housing 28 is incorporated in electric welding apparatus, such as that illustrated, each of the supporting shafts 52, 54 is insulated from the fixed supports 48, 50 by means of cup-shaped electric insulating members 68 which are closely fitted between the end portions of the shafts 52, 54 and the associated shaft supporting cups 64, 66. Inasmuch as the supporting shafts 52, 54 remain substantially motionless in their supporting cups 64, 66, a minimum of wearing forces is imparted to the insulating members 68 with the result that their useful life is greatly increased.

The lateral movements of side-shifting housing 28 are controlled, in order to align the ends 30, 32 of the strips, by means of a double-acting piston and cylinder arrangement 70, for example. Piston rod 72 of the piston and cylinder arrangement 70 is pivotally connected in this example to bracket 74 secured to the adjacent side wall of one of the housing supports for example, the support 44. The stroke of the piston desirably is generally parallel to the supporting shafts 52 and 54 and is equal to the anticipated range of lateral movement of the housing 28 and the piston is actuated by suitable hydraulic conduits or the like (not shown) coupled to control ports 76 of the cylinder 70. A suitable manual or solenoid operated valve (not shown) can be coupled in the aforementioned hydraulic circuit for controlling the movements of the side-shifting housing 28 from a convenient location. With this arrangement the lateral edges 78 of the clamped strip end portion 30 can be aligned quickly and accurately with the lateral edges 80 respectively of the other clamped end strip end portion 32 by moving the side-shifting housing 28 in either lateral direction as denoted by the arrow 34 of FIGURE 3.

In this arrangement the strip gauging structure includes a plate 82, as better shown in FIGURES 1 and 4, which can be raised and lowered generally between the normally spaced pairs of die assemblies 12, 14 and 20, 22 preparatory to the usual butt-welding operation. In this example, the gauge plate 82 is supported by a spaced pair of arms 84, 86 (FIGURE 4) which are pivotally mounted on the fixed upright supports 48, 50 respectively so as not to interfere with lateral movements of the side-shifting housing 28. The gauge plate 82 is raised and lowered in this example by cylinder 88 which is coupled to one of the supporting arms, for example the arm 86, as better shown in FIGURE 1.

It will be understood that the other die housing or support 26 can be similarly mounted for laterally aligning movement, if so desired.

From the foregoing it will be apparent that novel and efficient forms of welding aparatus and the like, and of alignment means for use therein have been disclosed. The alignment means are adapted for quick and facile operation under heavy loads from a remote control point if desired. While I have shown and described certain presently preferred embodiments of the invention and have illustrated certain presently preferred methods of practicing the same, it is to be distinctly understood that the invention is not limited thereto but may be otherwise variously embodied and practiced within the scope of the following claims.

We claim:

1. Apparatus for aligning and joining a pair of elongated objects, said apparatus comprising pairs of clamping members for clampingly engaging said objects, a support structure for each pair of said clamping members mounted on said apparatus, one of said support structures being mounted for lateral movement in a direction transversely of said objects so that lateral edge portions of said objects can be respectively aligned, the other of said support structures being mounted for movement longitudinally of said objects, means mounted on each of said support structures for withdrawing and advancing one of the associated clamping members, means for joining said objects when so clamped and aligned, said laterally movable support structure being disposed between a spaced pair of fixed supports, a pair of supporting and stabilizing shafts extend in spaced generally parallel relation between said fixed supports, said laterally movable support structure being slidably mounted on said shafts, and means for sliding said laterally movable support structure to and fro on said shafts.

2. Apparatus for aligning and welding a pair of elongated objects, said apparatus comprising pairs of clamping members for clampingly engaging said objects, a support structure for each pair of said clamping members mounted on said apparatus, at least one of said support structures being mounted for lateral movement in a direction transversely of said objects so that lateral edge portions of said objects can be respectively aligned, at least the other of said support structures being mounted for movement longitudinally of said objects to withdraw and advance the associated clamping members relative to the other of said clamping members, said laterally movable support structure being disposed between a spaced pair of fixed suports, a pair of supporting shafts extending in spaced generally parallel relationship between said fixed supports, said laterally movable support structure being slidably mounted on said shafts, means for conducting welding current to at least one of said clamping members, means for mounting said supporting shafts substantially motionless upon said fixed supports, and electrical insulating members interposed between each of said fixed supports and the adjacent portions respectively of each of said shafts.

3. The combination according to claim 2 wherein said mounting means are cup shaped retaining members mounted respectively on said fixed supports, the end portions of each of said supporting shafts are inserted respectively into said retaining members, and said electrical insulating members are cup shaped and inserted respectively between said cup shaped retaining members and the associated end portions of said shafts.

4. Apparatus for aligning and joining a pair of elongated objects, said apparatus comprising pairs of clamping members for clampingly engaging said objects, a support structure for each pair of said clamping members mounted on said apparatus, at least one of said support structures being mounted for lateral movement in a direction transversely of said objects so that lateral edge portions of said objects can be respectively aligned, and means mounted on each of said support structures for withdrawing and advancing one of the associated clamping members relative to the other of said associated clamping members, means for joining said objects when so clamped and aligned, said laterally movable support structure being disposed between a spaced pair of fixed supports, a pair of supporting shafts extended in spaced generally parallel relation between said fixed supports, said laterally movable support structure being slidably mounted on said shafts, and means muonted on one of said fixed supports and engaged with an adjacent portion of said laterally movable support structure for slidably moving said support strucutre along said supporting shafts.

5. The combination according to claim 4 wherein said moving means include a double-acting piston and cylinder arrangement having a piston stroke which is generally parallel to said supporting shafts.

6. Apparatus for aligning and electrically welding conductive objects, said apparatus comprising pairs of conductive clamping members for said objects, means for supporting each pair of said clamping members upon said apparatus, one of said supporting means being mounted for movement of its clamping members toward and away from other of said clamping members, the other of said supporting means being mounted for movement in a direction transverse to that of said first-mentioned movement, means for movably mounting each of said supporting means on said apparatus, the mounting means for at least one of said supporting means including a stationary support structure, means for electrically insulating said stationary support structure so that the associated clamping members are electrically isolated throughout their path of movement without subjecting said electrically insulating means to substantial wearing movements, and means for supplying welding current to said clamping members and to said objects when clamped and aligned therebetween.

7. The combination according to claim 1 wherein said longitudinally movable support structure is slidably mounted on a second pair of spaced shafts extending transversely of said first mentioned shafts, and additional means are provided for sliding said other support structure to and fro on said second shafts.

References Cited
UNITED STATES PATENTS

| | | | |
|---|---|---|---|
| 2,758,184 | 8/1956 | Seeloff et al. | |
| 3,007,031 | 10/1961 | Cooper | 219—82 X |
| 3,102,189 | 8/1963 | Jones et al. | 219—82 |
| 3,247,354 | 4/1966 | Mallett et al. | 219—82 |
| 3,256,419 | 6/1966 | Taylor et al. | 219—82 |
| 3,257,060 | 6/1966 | Williams et al. | 228—4 |

JOSEPH V. TRUHE, Primary Examiner

BARRY A. STEIN, Assistant Examiner

U.S. Cl. X.R.

228—4